United States Patent
Kawatsu

(10) Patent No.: US 10,506,126 B2
(45) Date of Patent: Dec. 10, 2019

(54) IMAGE READING APPARATUS AND IMAGE FORMING SYSTEM

(71) Applicant: Konica Minolta, Inc., Tokyo (JP)

(72) Inventor: Kenji Kawatsu, Kodaira (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/928,832

(22) Filed: Mar. 22, 2018

(65) Prior Publication Data

US 2018/0288269 A1 Oct. 4, 2018

(30) Foreign Application Priority Data

Mar. 28, 2017 (JP) ................. 2017-062802

(51) Int. Cl.
*H04N 1/12* (2006.01)
*G03G 15/00* (2006.01)
*H04N 1/028* (2006.01)
(Continued)

(52) U.S. Cl.
CPC ....... *H04N 1/1275* (2013.01); *G03G 15/5062* (2013.01); *H04N 1/00981* (2013.01);
(Continued)

(58) Field of Classification Search
CPC ............ H04N 1/1275; H04N 1/00981; H04N 1/0283; H04N 1/12; H04N 1/40056; H04N 1/52; H04N 2201/0094; G03G 15/5062
(Continued)

(56) References Cited

U.S. PATENT DOCUMENTS

2004/0156031 A1* 8/2004 Noda ................. B41J 13/10
355/405
2006/0245788 A1* 11/2006 Nishimura ......... G03G 15/6552
399/125
(Continued)

FOREIGN PATENT DOCUMENTS

| CN | 103662895 A | 3/2014 |
| CN | 104769929 A | 7/2015 |
| JP | 2009267796 A | 11/2009 |

OTHER PUBLICATIONS

Office Action dated May 21, 2019 from corresponding Chinese Application No. 201810249307.3 and English translation.
(Continued)

*Primary Examiner* — Allen H Nguyen
(74) *Attorney, Agent, or Firm* — Lucas & Mercanti, LLP

(57) ABSTRACT

An image reading apparatus includes a reader, a conveying path, a conveyer, a conveyer driving unit, a conveyer housing, a lighting unit, a cooler, and a frame. The reader reads an image on a sheet at a predetermined reading position. The conveying path guides the sheet having the image to the reading position and guides the sheet read by the reader in an ejecting direction. The conveyer conveys the sheet along the conveying path. The conveyer driving unit drives the conveyer. The conveyer housing supports the conveying path, the conveyer, and the conveyer driving unit. The lighting unit is fixed to an interior of the reader and illuminates the sheet conveyed by the conveyer to the reading position. The cooler cools the lighting unit. The frame separately fixes the reader and the conveyer housing. The cooler is fixed to the conveyer housing.

19 Claims, 4 Drawing Sheets

(51) Int. Cl.
  *H04N 1/00* (2006.01)
  *H04N 1/52* (2006.01)
  *H04N 1/40* (2006.01)
(52) U.S. Cl.
  CPC ............ *H04N 1/0283* (2013.01); *H04N 1/12* (2013.01); *H04N 1/40056* (2013.01); *H04N 1/52* (2013.01); *H04N 2201/0094* (2013.01)
(58) Field of Classification Search
  USPC ........................................................ 358/509
  See application file for complete search history.

(56) References Cited

U.S. PATENT DOCUMENTS

| | | | | |
|---|---|---|---|---|
| 2012/0099126 A1* | 4/2012 | Yokota | ............... | G03G 15/5062 358/1.13 |
| 2013/0264763 A1* | 10/2013 | Oyama | ................... | B65H 3/44 271/2 |
| 2014/0077443 A1* | 3/2014 | Doyo | ..................... | B65H 5/062 271/121 |
| 2014/0111835 A1* | 4/2014 | Ozawa | .................. | H04N 1/028 358/475 |
| 2015/0288842 A1* | 10/2015 | Enomoto | ........... | H04N 1/00989 358/474 |
| 2016/0223812 A1* | 8/2016 | Kudo | .................... | G02B 26/125 |
| 2016/0373603 A1* | 12/2016 | Ooishi | ............... | H04N 1/00984 |

OTHER PUBLICATIONS

CNIPA, Office Action for the corresponding Chinese patent application No. 201810249307.3, dated Oct. 24, 2019, with English translation (15 pages).

* cited by examiner

IMAGE READING APPARATUS AND IMAGE FORMING SYSTEM

BACKGROUND

1. Technological Field

The present invention relates to an image reading apparatus and an image forming system including the image reading apparatus.

2. Description of the Related Art

A typical electrophotographic image forming apparatus forms a reference image for image quality control on a sheet, reads the reference image with a reader, and modifies the conditions for forming images in accordance with the read values acquired through reading of the reference image, to achieve uniform image quality.

The reader is provided with an image sensor (charged coupled device (CCD)), a lighting unit (light emitting diode (LED)) illuminating the sheet, and an optical system (including mirrors and a lens) for focusing the light incident on the sheet from the lighting unit on the image sensor.

Vibration of the image sensor or the mirrors of the reader causes a wavy read image or a shift in the reading position, leading to inaccurate reading of the image on the sheet.

Vibration sources of the reader include 1) collision of the leading edge of a sheet with conveying guides or other components; 2) impact of a sheet entering conveying rollers or impact of a sheet ejected from the conveying rollers; 3) a motor driving the conveying rollers; and 4) a fan motor for cooling disposed in the apparatus.

The magnitude of vibration caused by vibration sources 1) and 2) greatly varies depending on the physical properties of the sheet (for example, basis weight or stiffness), the size of the sheet, or the moving rate. A high moving rate and a wide range of available types of sheets are desirable in consideration of productivity.

A straight conveying path can reduce vibration caused by collision of a sheet with conveying guides even at a high moving rate and transfer of a very thick sheet. Moreover, a straight conveying path can reduce the contact force applied to the sheet travelling on the conveying rollers. This can reduce the load applied to the motor driving the conveying rollers and the vibration of the system.

However, a typical image forming apparatus cannot prevent vibration due to contact of the reader with the sheet because the reader partly defines the conveying path of the sheet (in detail, the faces of the conveying guides are disposed on the bottom face of the reader). Thus, the reader should avoid contact with other vibration sources as much as possible to achieve a satisfactory reading accuracy.

The reader includes a lighting unit including a light source, such as an LED or a halogen lamp. The lighting unit has a drawback of instable illuminance due to its heating. Thus, the light source should be cooled with a cooling fan.

A reader has been disclosed that includes a housing having two compartments partitioned with a wall and a cooling fan disposed in one of the compartments (for example, refer to Japanese Patent Application Laid-Open Publication No. 2009-267796).

As is disclosed in this patent publication, the cooling fan fixed to the housing of the reader including the lighting unit can cool the lighting unit at a closer distance.

However, such a cooling fan fixed to the housing of the reader transmits its vibration to the interior of the reader.

A possible configuration of the cooling fan is to be fixed to the housing of the reader via dampers. However, such a configuration causes an increase in the number of components and production costs.

Another possible configuration is fixing of the components of the reader, such as mirrors and a CCD, with dampers. Such a configuration not only causes an increase in the number of components and production costs but also unsatisfactory precision of the fixed positions of the components, such as the mirrors and the CCD.

SUMMARY

An object of the present invention, which has been conceived in light of the circumstances described above, is to provide an image reading apparatus that can accurately read an image formed on a sheet while the lighting unit maintains stable illuminance, and an image forming system including the image reading apparatus.

To achieve at least one of the abovementioned objects, according to an aspect of the present invention, an image reading apparatus includes:

a reader which reads an image on a sheet at a predetermined reading position;

a conveying path which guides the sheet having the image to the reading position and which guides the sheet read by the reader in an ejecting direction;

a conveyer which conveys the sheet along the conveying path;

a conveyer driving unit which drives the conveyer;

a conveyer housing which supports the conveying path, the conveyer, and the conveyer driving unit;

a lighting unit which is fixed to an interior of the reader and which illuminates the sheet conveyed by the conveyer to the reading position;

a cooler which cools the lighting unit; and a frame which separately fixes the reader and the conveyer housing, wherein the cooler is fixed to the conveyer housing.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

In the description below, the horizontal direction in FIG. 1 corresponds to the X direction, the vertical direction corresponds to the Z direction, and a direction orthogonal to the X and Z directions or the front-back direction corresponds to the Y direction.

Configuration of Image Forming System

An image forming system G according to an embodiment will now be described.

Figure 1:
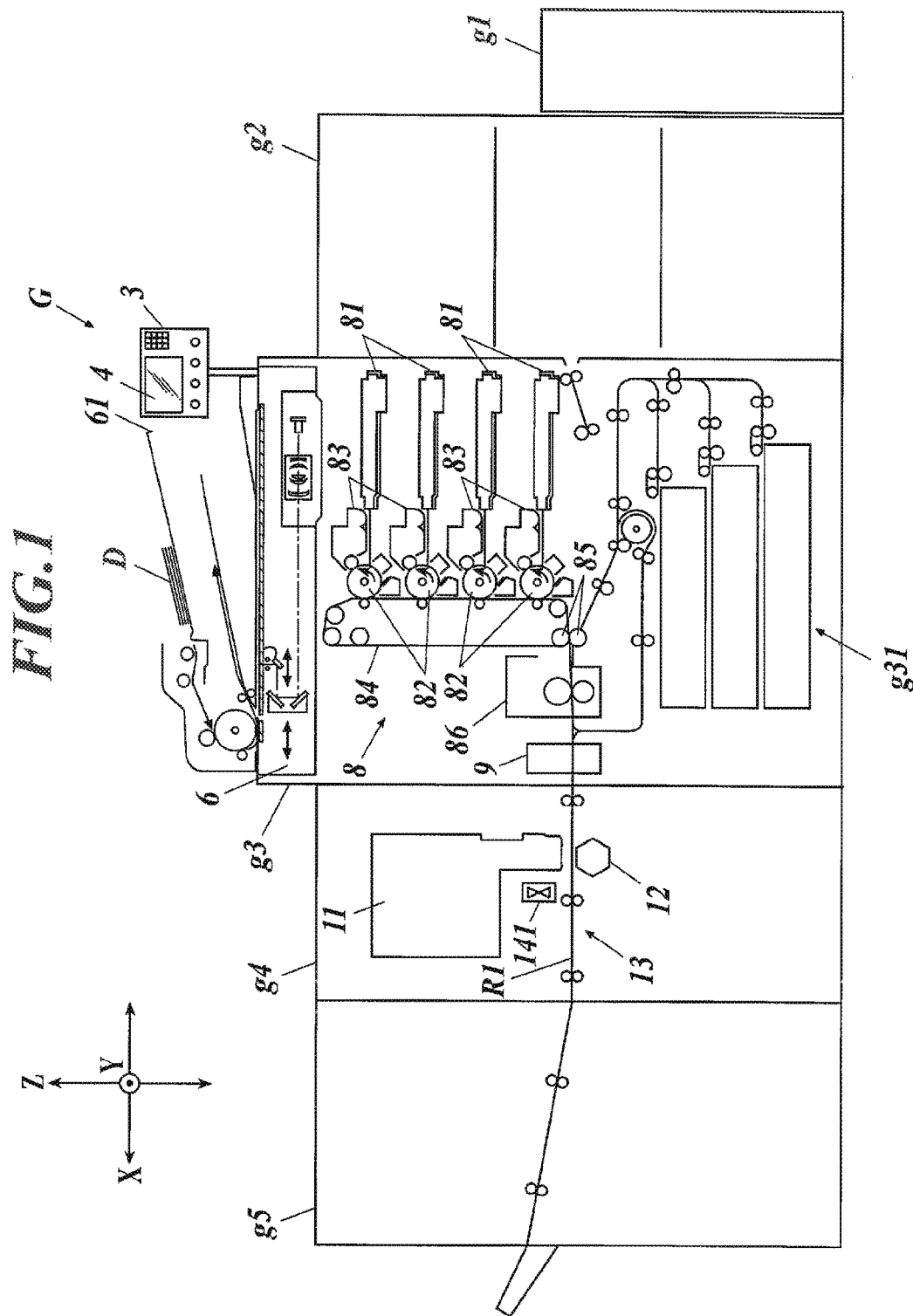
FIG. 1 is a schematic configuration diagram of an image forming system according to this embodiment.

With reference to FIG. 1, the image forming system G includes a print controller g1, a sheet feeder g2, a main unit g3, an image reading apparatus g4, and a finishing apparatus g5.

The print controller g1 receives page description language (PDL) data from a computer terminal via a network and rasterizes the PDL data into bitmap image data.

The print controller g1 generates image data for each of the colors cyan (C), magenta (M), yellow (Y), and black (K) and outputs the image data to the main unit g3.

The sheet feeder g2 includes a plurality of large-volume feeder trays.

The sheet feeder g2 conveys sheets from a sheet feeder tray to the main unit g3 under an instruction from the main unit g3.

An image forming unit 8 of the main unit g3 forms an image on a sheet on the basis of image data of an original document D read by a scanner 6 or image data generated by the print controller g1. The main unit g3 conveys the sheet after the formation of the image to the image reading apparatus g4.

A reader 11 of the reading apparatus g4 reads a reference image (providing a reference for, for example, color, tone correction, line width, color resist, and/or front/back alignment) on a sheet and outputs the read image data to a hardware processor 1. The image reading apparatus g4 conveys the sheet having the image read by the reader 11 to the finishing apparatus g5.

The finishing apparatus g5 carries out post-treatment on the sheet sent from the image reading apparatus g4 and ejects the post-treated sheet. Examples of the post-treatment includes, stapling, punching, folding, and bookbinding. The post-treatment is not essential and thus the finishing apparatus g5 carries out the post-treatment only after an instruction from the main unit g3. If the post-treatment is not instructed, the finishing apparatus g5 ejects the sheet without post-treatment.

Configuration of Main Unit

The configuration of the main unit g3 will now be described.

Figure 2:
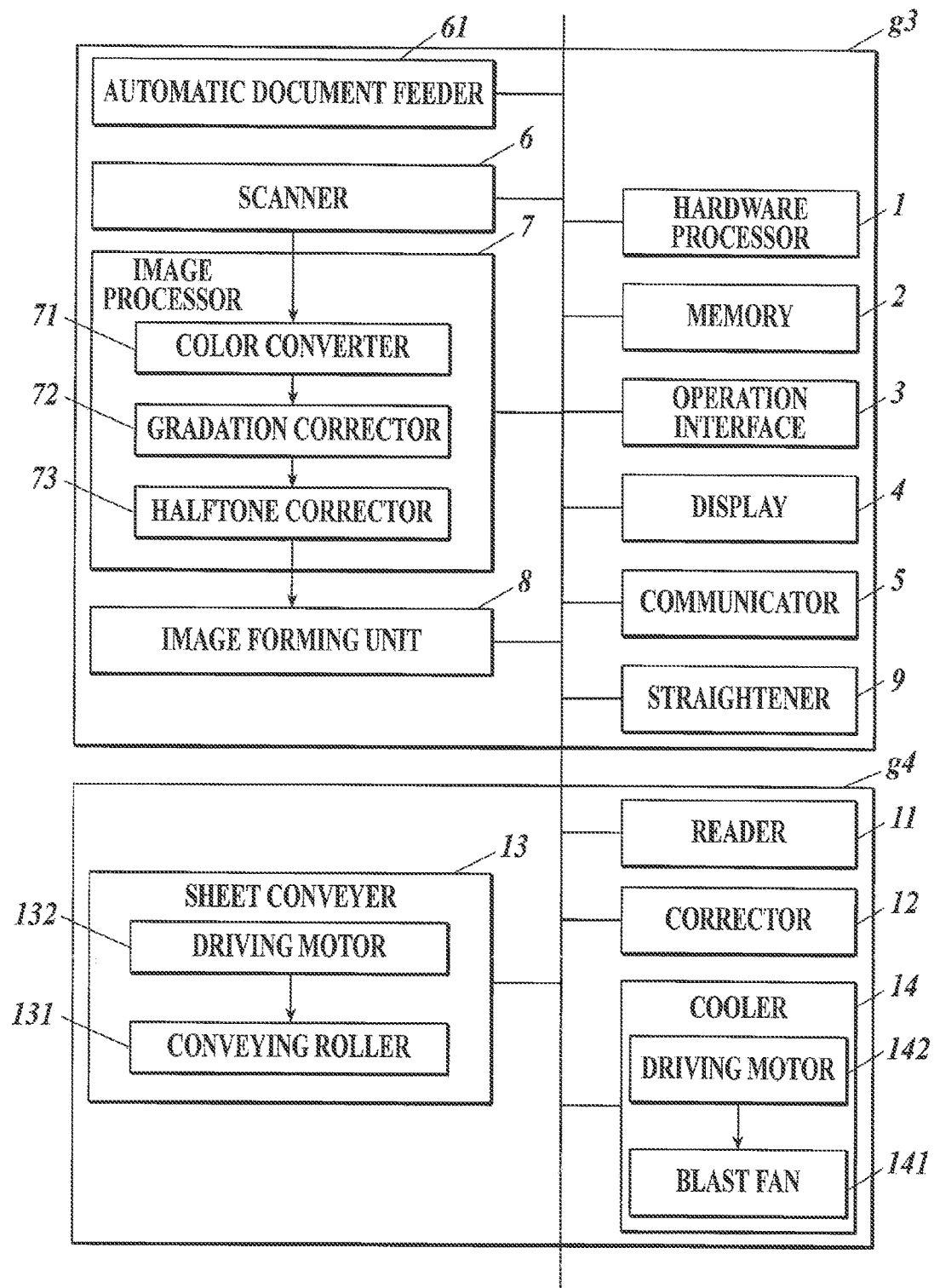
FIG. 2 is a functional block diagram of a main unit and an image reading apparatus.

With reference to FIGS. 1 and 2, the main unit g3 includes, a hardware processor 1, a memory 2, an operation interface 3, a display 4, a communicator 5, an automatic sheet feeder 61, a scanner 6, an image processor 7, an image forming unit 8, a straightener 9, and sheet feeder trays g31.

The hardware processor 1 includes a central processing unit (CPU) and a random access memory (RAM). The hardware processor 1 reads programs stored in the memory 2 and controls the components of the image forming system G in accordance with these programs.

For example, the hardware processor 1 feeds a sheet from the sheet feeder g2 or one of the sheet feeder tray g31 in response to an instruction of a job setting. The hardware processor 1 allows the image processor 7 to correct and process the image data and the image forming unit 8 to form an image. In the case where the job setting includes the post-treatment, the hardware processor 1 instructs the finishing apparatus g5 to carry out the post-treatment.

The memory 2 stores programs and files readable by the hardware processor 1. The memory 2 may be a storage medium, such as a hard disk or a read only memory (ROM). The memory 2 stores reference image data for adjustment of image quality.

The operation interface 3 includes a touch panel integrated with operating keys and the display 4 and outputs operating signals corresponding to operations of these components to the hardware processor 1. A user can operate the operation interface 3 to input instructions on modification of the job settings and processing.

The display 4 may be a liquid crystal display (LCD) and displays an operating menu and other images in accordance with instructions from the hardware processor 1.

The communicator 5 establishes communication with another computer, such as a server or another image forming system, via a network under an instruction from the hardware processor 1.

The automatic sheet feeder 61 includes a sheet tray for placing an original document D, a mechanism for conveying the original document D, and conveying rollers. The automatic sheet feeder 61 conveys the original document D to a predetermined conveying path.

The scanner 6 includes an optical system including a light source and reflection mirrors. The scanner 6 reads the image on the original document D conveyed along the predetermined conveying path or an original document D placed on a glass platen, generates an image data item for each of the colors red (R), green (G), and blue (B), and outputs the generated image data items to the image processor 7.

The image processor 7 corrects the image data from the scanner 6 or the print hardware processor g1, processes the corrected image data, and outputs the processed image data to the image forming unit 8.

With reference to FIG. 2, the image processor 7 includes a color converter 71, a tone corrector 72, and a halftone processor 73.

The color converter 71 conducts color conversion of the image data items of the colors R, G, and B from the scanner 6 and outputs image data of the colors C, M, Y, and K.

Alternatively, the color converter 71 may conduct color conversion of the image data items of the colors C, M, Y, and K from the print hardware processor g1 for color correction, and output the color-corrected image data of the colors C, M, Y, and K.

During the color conversion, the color converter 71 retrieves a lookup table (LUT) storing the color-converted tone values of the colors C, M, Y, and K in relation to the tones values of the colors R, G, and B. During the color correction, the color converter 71 retrieves an LUT storing the color-corrected tone values of the colors C, M, Y, and K in relation to the tone values of the colors C, M, Y, and K.

The tone corrector 72 corrects the tone of the image data output from the color converter 71 or the print hardware processor g1.

During the tone correction, the tone corrector 72 retrieves an LUT storing correction values in relation to tone values so as to match the tone properties of the image with target tone properties. The tone corrector 72 retrieves correction values corresponding to the tone values of the pixels in the image data, from the LUT for tone correction, and outputs image data consisting of the correction values.

The halftone processor 73 conducts halftone processing on the image data from the tone corrector 72. Examples of the halftone processing includes screen processing with a dither matrix and error diffusion.

The halftone processor 73 outputs the image data after the halftone processing to the image forming unit 8.

The image forming unit 8 forms an image on a sheet on the basis of the image data from the image processor 7.

With reference to FIG. 1, the image forming unit 8 is provided with four sets of exposing units 81, photoreceptors 82, and developing units 83 for the respective colors C, M, Y, and K. The image forming unit 8 includes an intermediate transfer belt 84, secondary transfer rollers 85, and a fixing unit 86.

Each exposing unit 81 includes laser diodes (LDs) or light emitting devices. The exposing unit 81 drives the LDs on the basis of the image data and illuminates the corresponding charged photoreceptor 82 with a laser beam for exposure. The relevant developing unit 83 feeds toner onto the photoreceptor 82 with a charged developer roller and develops an electrostatic latent image in response to the exposure on the photoreceptor 82.

The four images formed with the respective four color toners on the respective four photoreceptors 82 are sequentially transferred to the intermediate transfer belt 84. This forms a color image on the intermediate transfer belt 84. The intermediate transfer belt 84 is an endless belt wound around several rollers. The intermediate transfer belt 84 rotates in response to the rotation of the rollers.

The secondary transfer rollers 85 transfer the color image from the intermediate transfer belt 84 to the sheet fed from the sheet feeder g2 or the sheet feeder tray g31. The fixing unit 86 applies heat and pressure to the sheet to fix the color image to the sheet.

The straightener 9 corrects deformation of the sheet due to the fixing to flatten the face of the sheet. The sheet readily deforms in the fixing process and should be flattened before reading of the reference image. Thus, the straightener 9 is disposed between the fixing unit 86 and the reader 11 in the conveying direction of the sheet, as illustrated in FIG. 1.

Configuration of Image Reading Apparatus

The configuration of the image reading apparatus g4 will now be described.

The image reading apparatus g4 includes a reader 11, a corrector 12, a sheet conveyer 13, and a cooler 14.

The reader 11 reads the image formed on the sheet being conveyed along a conveying path R1 by the sheet conveyer 13, at a predetermined reading position.

Figure 3:
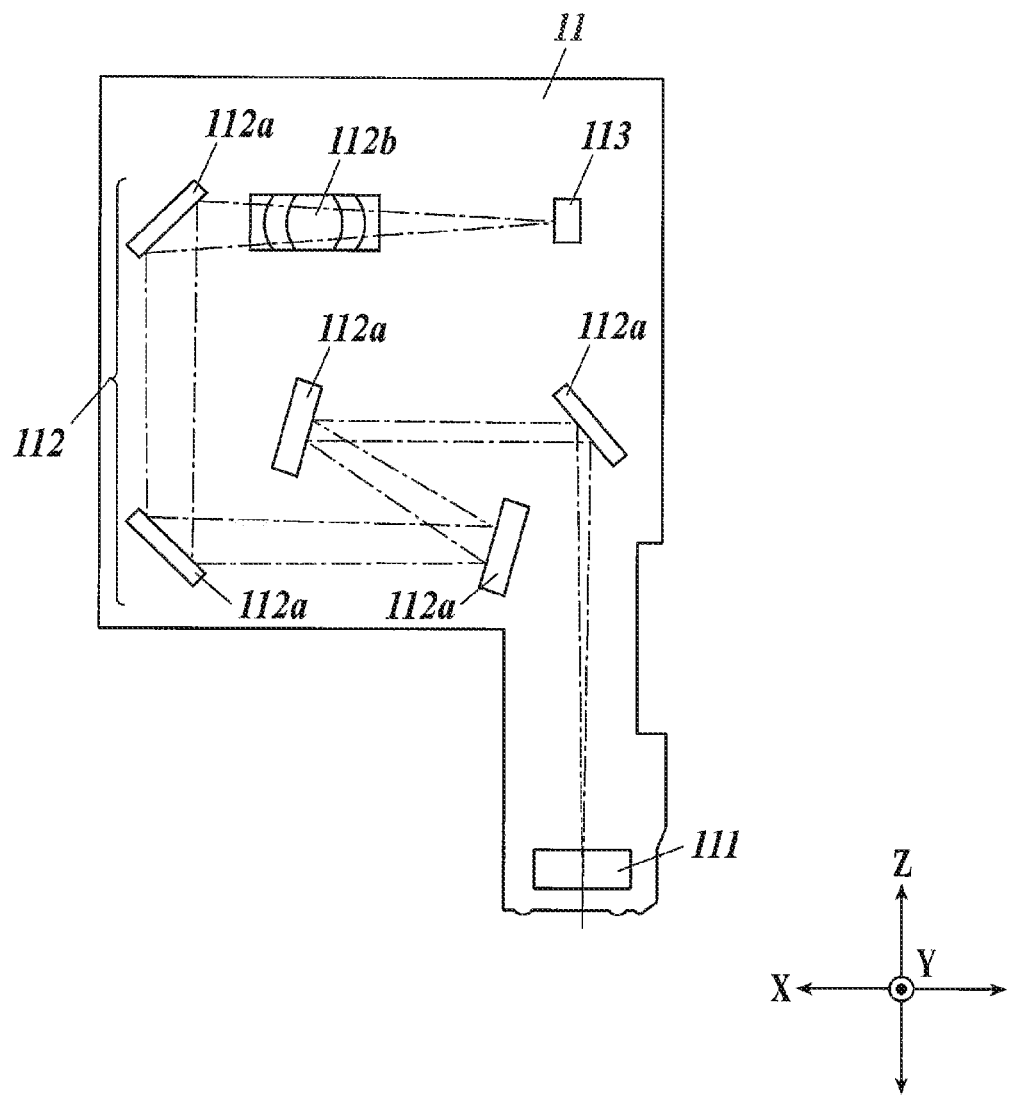
FIG. 3 is a side view of the internal configuration of an image reader.

With reference to FIGS. 1 and 3, the reader 11 includes a lighting unit 111, an optical system 112, and a CCD 113. The lighting unit 111, the optical system 112, and the CCD 113 are fixed to the interior of the housing of the reader 11.

The lighting unit 111 includes a light source, such as an LED or a halogen lamp, and illuminates the sheet conveyed by conveying rollers 131, at the reading position of the reader 11.

The optical system 112 includes a plurality of mirrors 112*a* (five according to this embodiment) and a lens 112*b*. The optical system 112 focuses the light from the lighting unit 111 incident on the sheet (the image at the reading position), on the CCD 113.

The CCD 113 reads the image formed on the sheet at the predetermined reading position. The CCD 113 is a color line sensor that can read the entire length of the sheet in the width or Y direction.

The reader 11, which has the configuration described above, can sequentially read the image formed on the sheet across the entire width as the sheet passes the reading position. For example, in this embodiment, the reader 11 reads a reference image (providing a reference for, for example, color, tone correction, line width, color resist, and/or front/back alignment) formed on a sheet, and feeds back the read image data to the image processor, the print controller, and sheet conveyer for correction.

The corrector 12 is disposed below the conveying path R1 and faces the reader 11. The corrector 12 includes a white reference plate for determining the correction values for shading correction conducted during reading of the image. The white reference plate is disposed at the reading position and is read in intervals by the CCD 113 while no sheet is passing (for example, between consecutive sheets).

Figure 4:
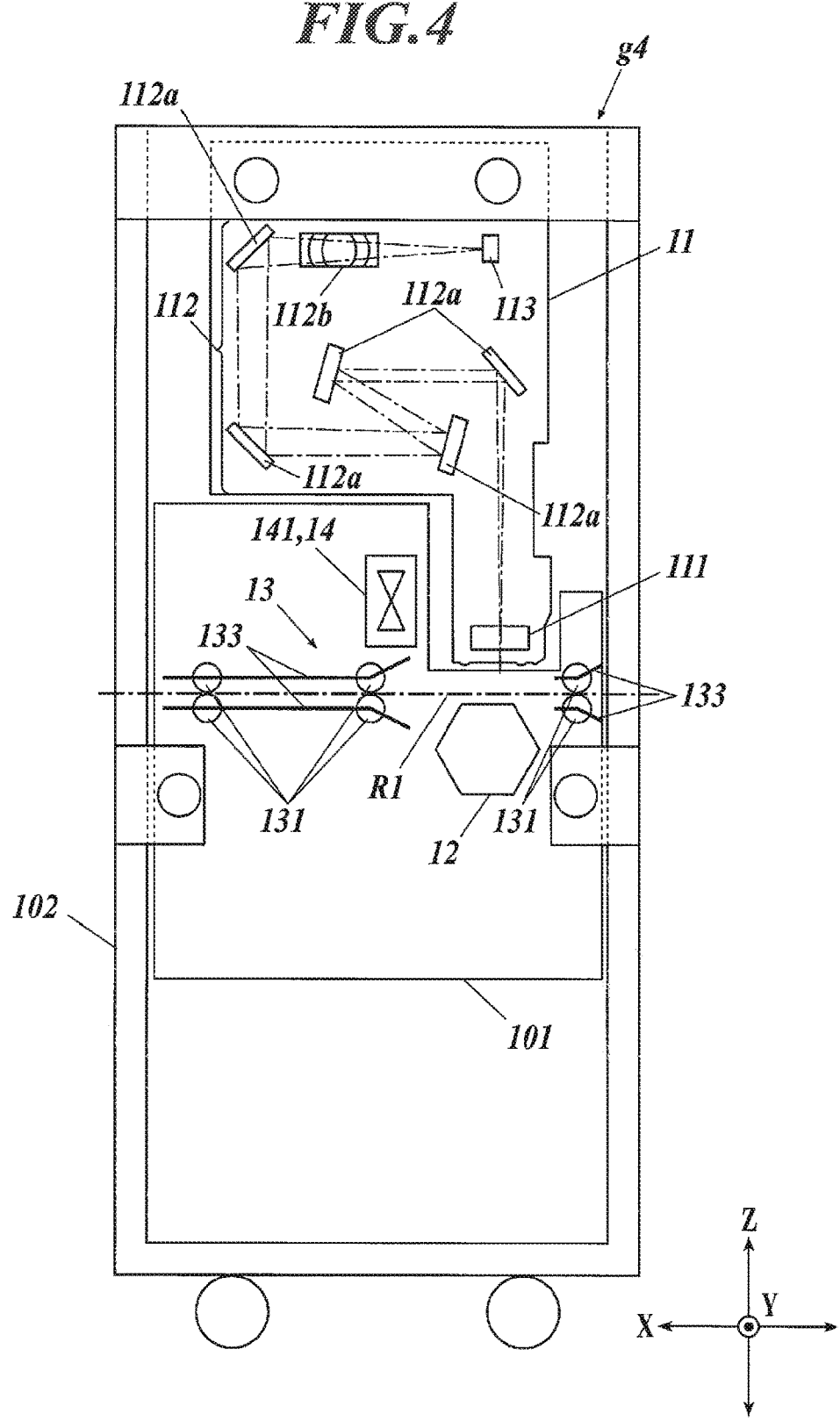
FIG. 4 is a schematic configuration diagram of the image reading apparatus.

With reference to FIGS. 2 and 4, the sheet conveyer 13 includes conveying rollers 131, a driving motor 132, and conveying guides 133.

Several conveying rollers 131 or conveyers are provided in the conveying path R1 so as to convey sheets along the conveying path R1.

The driving motor 132 or conveyer driving unit drives the conveying rollers 131 in accordance with instructions from the hardware processor 1. The driving motor 132 is disposed closer to the center of the sheet than the conveying rollers 131 in the width or Y direction.

At least two conveying guides 133 are provided in the conveying path R1 and guide the sheet conveyed by the conveying rollers 131.

During reading of the image by the reader 11, the sheet conveyer 13 conveys the sheet by the conveying rollers 131 disposed along the conveying path R1 such that the sheet passes through the reading position of the reader 11 at a predetermined rate. The sheet conveyer 13 conveys the sheet having the image read by the reader 11 to the finishing apparatus g5.

With reference to FIGS. 2 and 4, the cooler 14 includes a blast fan 141 that blows in a predetermined direction and a driving motor 142 or blast driving unit that drives the blast fan 141. The driving motor 142 is disposed closer to the center of the sheet than the blast fan 141 in the width or Y direction.

The cooler 14 is fixed to a conveyer housing 101 such that the blast fan 141 faces the lighting unit 111. In this way, the cooler 14 can blow the lighting unit 111 so as to cool the lighting unit 111.

With reference to FIG. 4, the conveying path R1, which is defined by the conveying guides 133 and the bottom face of the reader 11, extends in a substantially linear line. The conveying path R1 guides the sheet having an image to the reading position and then guides the sheet in the ejecting direction after reading by the reader 11.

The corrector 12, the sheet conveyer 13 (the conveying rollers 131 and the driving motor 132), the cooler 14, and the conveying path R1 of the image reading apparatus g4 are fixed to the conveyer housing 101, except for the reader 11.

The reader 11 and the conveyer housing 101 are separately fixed to a frame 102.

The configuration described above causes the vibration caused by collision of the sheet with the components such as the conveying guides 133 and the conveying rollers 131 to be transmitted to the conveyer housing 101, the frame 102, and the reader 11, in this order. This provides a sufficient length for the vibration to attenuate before it reaches the reader 11.

Control of Sheet Conveying in Image Forming Apparatus

The control of sheet conveying in the image forming system G according to this embodiment will now be described.

In this embodiment, it is preferred that the moving rate of a sheet passing through the reader 11 be 750 mm/sec or less. This is because an increase in the moving rate of the sheet passing through the reader 11 causes an increase in the magnitude of the vibration caused by collision of the sheet with the components such as the conveying guides 133 and the conveying rollers 131. A moving rate within the range mentioned above can reduce the vibration caused by collision of the sheet with the components such as the conveying guides 133 and the conveying rollers 131. Thus, in this embodiment, the hardware processor 1 controls the driving motor 132 to achieve a moving rate of 750 mm/sec for the sheet passing through the reader 11, so that the conveying rollers 131 convey the sheet passing through the reader 11 at a moving rate of 750 mm/sec or less.

In this embodiment, it is preferred that the basis weight of the sheet being conveyed be 400 $g/m^2$ or less. This is because an increase in the basis weight of the sheet being conveyed increases the magnitude of vibration caused by collision of the sheet with the components such as the conveying guides 133 and the conveying rollers 131. A sheet having a basis weight within the range mentioned above can reduce the vibration caused by collision of the sheet with the components such as the conveying guides 133 and the conveying rollers 131. Thus, in this embodiment, the conveying rollers 131 convey a sheet having a basis weight of 400 $g/m^2$ or less.

Advantageous Effects

As described above, the image reading apparatus g4 of the image forming system G according to this embodiment includes:

a reader 11 reading an image on a sheet at a predetermined reading position;

a conveying path R1 guiding the sheet having the image to the reading position and then guiding the sheet in the ejecting direction after reading by the reader 11;

a conveyer or conveying rollers 131 conveying the sheet along the conveying path R1;

a conveyer driving unit or driving motor 132 driving the conveyer;

a conveyer housing 101 supporting the conveying path R1, the conveyer, and the conveyer driving unit;

a lighting unit 111 fixed to the interior of the reader 11 and illuminating the sheet conveyed to the reading position by the conveyer;

a cooler 14 cooling the lighting unit 111; and a frame 102 separately fixing the reader 11 and the conveyer housing 101.

The cooler 14 is fixed to the conveyer housing 101.

Consequently, the image reading apparatus g4 according to this embodiment can cool the lighting unit 111. This can stabilize the illuminance of the lighting unit 111. The vibration generated by collision of the sheet with the components such as the conveying guides 133 and the conveying rollers 131 is transmitted to the conveyer housing 101, the frame 102, and the reader 11, in this order. This provides a length large enough for the vibration to sufficiently attenuate before it reaches the reader 11. Thus, the illuminance of the lighting unit 111 is stabilized, and thus, the image formed on the sheet can be accurately read.

The reader 11 of the image reading apparatus g4 according to this embodiment partly defines the conveying path R1.

Thus, even if vibration due to contact of the reader 11 and the sheet is transmitted to the reader 11 in the image reading apparatus g4 according to this embodiment, vibration from other vibration sources are attenuated, and thus, the image formed on the sheet can be accurately read.

The cooler 14 of the image reading apparatus g4 according to this embodiment includes a blast fan 141 blowing the lighting unit 111 and a blast driving unit or driving motor 142 driving the blast fan 141.

Thus, in the image reading apparatus g4 according to this embodiment, the distance between the driving motor 142, which is a vibration source, and the reader 11 is large enough to sufficiently attenuate the vibration before it reaches the reader 11, and thus the image formed on the sheet can be accurately read.

The conveyer of the image reading apparatus g4 according to this embodiment conveys the sheet passing through the reader 11 at a moving rate of 750 mm/sec or less.

Thus, the image reading apparatus g4 according to this embodiment can reduce vibration caused by collision of the sheet with the components such as the conveying guides 133 and the conveying rollers 131, resulting in more accurate reading of the image on the sheet.

In the image reading apparatus g4 according to this embodiment, the conveyer conveys a sheet having a basis weight of 400 $g/m^2$ or less.

Thus, the image reading apparatus g4 according to this embodiment can reduce vibration caused by collision of the sheet with the components such as the conveying guides 133 and the conveying rollers 131, resulting in more accurate reading of the image on the sheet.

The embodiments of the present invention have been described in detail. The embodiments should not be construed to limit the scope of the invention and may be modified within the scope of the invention.

Modification

In the embodiment described above, the conveying path R1 has a substantially linear shape. Alternatively, the conveying path R1 may have any other shape. In specific, the conveying path R1 may include a curved portion. It is preferred that the curved portion have a curvature angle of 15° or smaller. This is because a larger curvature angle of curved portion causes an increase in the magnitude of the vibration caused by collision of the sheet with the components near the curved portion, such as the conveying guides 133 and the conveying rollers 131. In particular, a curved portion having a curvature angle of 15° or smaller can sufficiently reduce the vibration caused by collision of the sheet with the components near the curved portion, such as the conveying guides 133 and the conveying rollers 131, so that the influence of the vibration during reading can be ignored.

In the case where the conveying path R1 includes a curved portion as described above, the curvature angle of the curved portion should be 15° or smaller so as to sufficiently reduce the vibration caused by collision of the sheet with the components near the curved portion, such as the conveying guides 133 and the conveying rollers 131. This achieves accurate reading of the image formed on the sheet.

Other Modifications

In the embodiment described above, the cooler 14 includes the blast fan 141 and the driving motor 142. Alternatively, the cooler 14 may have any other configuration. For example, the cooler 14 may include a water cooling device that cools a target with water circulated by a pump. Even in such a case, the water cooling device may be fixed to the conveyer housing 101 so as to sufficiently attenuate the vibration of the pump.

In the embodiment described above, the housing of the reader 11 has an L shape, that is, a bottom face downward protrusion (on the right in the drawing). Alternatively, the housing of the reader 11 may have any shape. In specific, the housing of the reader 11 may have any shape that can provide a light path long enough for reading. For example, the housing of the reader 11 may have a shape of a box with no downward protrusion. Alternatively, the housing of the reader 11 may have a downward protrusion in the central region of the bottom face. In such a case, it is preferred that the contact area of the bottom face of the reader 11, which also defines the conveying path R1, and the sheet be small (for example, the bottom face have a protrusion at the edge or in the central area) so as to prevent vibration caused by contact of the bottom face of the reader 11 and the sheet.

In the embodiment described above, the cooler 14 is disposed downstream of the protrusion of the reader 11 in the conveying direction. Alternatively, the cooler 14 may be disposed at any position. In specific, the cooler 14 may be disposed upstream of the protrusion of the reader 11 in the conveying direction. In the case where the housing of the reader 11 has a shape of a box, it is preferred to dispose the cooler 14 at a position either upstream or downstream in the conveying direction, whichever is closer to the light source.

In the embodiment described above, the reader 11 faces the corrector 12 across the conveying path R1, where reader 11 is disposed above and the corrector 12 is disposed below the conveying path R1. Alternatively, the reader 11 and the corrector 12 may be disposed at any positions. For example, the corrector 12 may face the reader 11 across the conveying path R1, where the corrector 12 is disposed above and the reader 11 disposed below the conveying path R1.

In the embodiment described above, one reader 11 and one corrector 12 are provided. Alternatively, any number of the reader 11 and the corrector 12 may be provided. For example, two readers 11 and two correctors 12 may be provided. In such a case, one of the readers 11 faces one of the correctors 12 across the conveying path R1, where the reader 11 is disposed above the conveying path R1 and the correctors 12 is disposed below the conveying path R1, whereas the other reader 11 faces the other corrector 12 across the conveying path R1, where the other reader 11 is disposed below the conveying path R1 and the other corrector 12 is disposed above the conveying path R1. In this way, each pair of the reader 11 and the corrector 12 can read each side of a sheet, so that both sides of a sheet are read in a single operation.

The detailed configuration and operation of the components of the image forming system described above may be appropriately modified without departing from the scope of the present invention.

Although embodiments of the present invention have been described and illustrated in detail, the disclosed embodiments are made for purposes of illustration and example only and not limitation. The scope of the present invention should be interpreted by terms of the appended claims The entire disclosure of Japanese patent application No. 2017-062802, filed on Mar. 28, 2017, is incorporated herein by reference in its entirety.

What is claimed is:

1. An image reading apparatus comprising:
    a reader which reads an image on a sheet at a predetermined reading position;
    a conveying path which guides the sheet having the image to the reading position and which guides the sheet read by the reader in an ejecting direction;
    a conveyer which conveys the sheet along the conveying path;
    a conveyer driving unit which drives the conveyer;
    a conveyer housing which supports the conveying path, the conveyer, and the conveyer driving unit;
    a lighting unit which is fixed to an interior of the reader and which illuminates the sheet conveyed by the conveyer to the reading position;
    a cooler which cools the lighting unit; and
    a frame which separately fixes the reader and the conveyer housing,
    wherein the cooler is fixed to the conveyer housing, and
    wherein the cooler, the frame, the conveyor housing, and the reader are configured so that vibrations generated by the cooler are attenuated through the conveyor housing and the frame before reaching the reader.

2. The image reading apparatus according to claim 1, wherein a portion of the reader defines the conveying path.

3. The image reading apparatus according to claim 1, wherein the cooler comprises:
    a blast fan which blows the lighting unit; and
    a blast driving unit which drives the blast fan.

4. The image reading apparatus according to claim 1, wherein the cooler comprises:
    a water cooling device which cools the lighting unit with water circulated by a pump.

5. The image reading apparatus according to claim 1, wherein the conveying path comprises a curved portion.

6. The image reading apparatus according to claim 5, wherein the curved portion has an angle of curvature of 15° or smaller.

7. The image reading apparatus according to claim 1, wherein a portion of the housing of the reader has a protrusion toward the sheet.

8. The image reading apparatus according to claim 1, wherein the conveyer conveys the sheet passing through the reader at a moving rate of 750 mm/sec or less.

9. The image reading apparatus according to claim 1, wherein the sheet conveyed by the conveyer has a basis weight of 400 g/m2 or less.

10. An image forming system comprising:
    an image forming unit which forms an image based on image data; and
    the image reading apparatus according to claim 1 which reads the image formed by the image forming unit on a sheet.

11. An image reading apparatus comprising:
    a reader which reads an image on a sheet at a predetermined reading position;
    a conveyer which conveys the sheet having the image through the reading position;
    a lighting unit which is fixed to an interior of the reader and which illuminates the sheet conveyed by the conveyer to the reading position;
    a cooler which cools the lighting unit;
    a housing; and
    a frame which separately supports the reader and the housing,
    wherein the housing supports the cooler, and
    wherein the cooler, the frame, the housing, and the reader are configured so that vibrations generated by the cooler are attenuated through the housing and the frame before reaching the reader.

12. The image reading apparatus according to claim 11, wherein the housing supports the conveyer and a conveyer driving unit which drives the conveyer.

13. The image reading apparatus according to claim 11, wherein a portion of the reader constitutes a conveying path through which the sheet is conveyed by the conveyer.

14. The image reading apparatus according to claim 11, wherein the cooler comprises:
    a blast fan which blows the lighting unit; and
    a blast driving unit which drives the blast fan.

15. The image reading apparatus according to claim 11, wherein the cooler comprises:

a water cooling device which cools the lighting unit with water circulated by a pump.

16. The image reading apparatus according to claim 11, wherein a conveying path through which the sheet is conveyed by the conveyer comprises a curved portion, and the curved portion has an angle of curvature of 15° or smaller.

17. The image reading apparatus according to claim 11, wherein the conveyer conveys the sheet passing through the reader at a moving rate of 750 mm/sec or less.

18. The image reading apparatus according to claim 11, wherein the sheet conveyed by the conveyer has a basis weight of 400 g/m2 or less.

19. An image forming system comprising:
- an image forming unit which forms an image based on image data; and
- the image reading apparatus according to claim 12 which reads the image formed by the image forming unit on a sheet.

* * * * *